United States Patent [19]

Tanaka et al.

[11] 4,029,609

[45] June 14, 1977

[54] NOVEL POLYETHERS HAVING PENDENT AMINOMETHYLENE GROUPS AND HAVING IMPROVED THERMAL AND CHEMICAL STABILITY

[75] Inventors: Masakazu Tanaka; Kazuo Watanabe, both of Otsu, Japan

[73] Assignee: Toyo Boseki Kabushiki Kaisha, Japan

[22] Filed: June 11, 1975

[21] Appl. No.: 585,779

[52] U.S. Cl. .................... 260/2 R; 260/2.1 E; 260/47 R; 260/47 ET; 260/611 B
[51] Int. Cl.² ...................... C08G 65/00
[58] Field of Search ........... 260/80.3 N, 80.3 E, 260/47 R, 47 CZ, 47 ET, 79.3 M, 611 B, 613 B, 2 R, 2.1 C, 2.1 E

[56]  References Cited
UNITED STATES PATENTS

| | | | |
|---|---|---|---|
| 2,498,195 | 2/1950 | Ballard | 260/584 B |
| 3,078,271 | 2/1963 | De Groote | 260/613 B |
| 3,519,559 | 7/1970 | Quinlan | 260/613 B |

*Primary Examiner*—Joseph L. Schofer
*Assistant Examiner*—Peter F. Kulkosky
*Attorney, Agent, or Firm*—Birch, Stewart, Kolasch and Birch

[57] ABSTRACT

Disclosed are polyethers of the general formula:

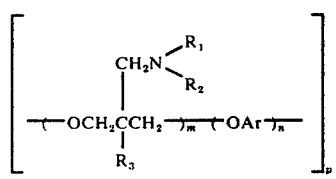

wherein, $R_1$ and $R_2$ are each a hydrogen atom or an alkyl group having 1 to 6 carbon atoms and, $R_1$ and $R_2$, when these are bonded to each other, may be polymethylene groups that form a heteroring with the nitrogen atom, $R_3$ is a hydrogen atom or an alkyl group of 1 to 4 carbon atoms, $m$ is an integer from 1 to 20, $n$ is 0 or 1, $p$ is an integer from 5 to 1000 and Ar is at least one member selected from the group consisting of divalent aromatic residues of the following formulas:

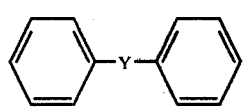

(1)

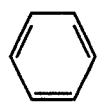

(2)

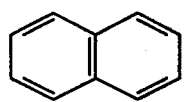

(3)

and

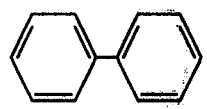 (4)

in formula (1), Y is an alkylene group of 1 to 4 carbon atoms, an alkylidene group of 3 to 15 carbon atoms, —O—, —SO₂—, —S— or >C=O.

11 Claims, No Drawings

NOVEL POLYETHERS HAVING PENDENT AMINOMETHYLENE GROUPS AND HAVING IMPROVED THERMAL AND CHEMICAL STABILITY

BACKGROUND OF THE INVENTION

This invention relates to novel polyethers having an amino group and more particularly, to novel polyethers having an excellent heat-resisting property and therefore qualifying for various uses.

Heretofore, various processes for manufacture of polymers having an amino group have been proposed with a view of improving synthetic fibers in dyeability. Of these polymers, particularly noted are polyurethanes, polyesters, polyamides, etc. Although these conventionally known polymers are capable of improving the dyeability if synthetic fibers by incorporation therein, the do not satisfy a rich variety of uses due to the fact that they contain no high amino group contents and do not prove satisfactory in terms of heat-resisting property and hydrolysisresisting property. As the polymers having no amino group, Belgian Pat. No. 693,000 has disclosed polyamides of the type which have, as part of the diamine components, the compounds of the general formula:

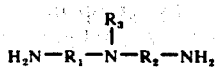

wherein, $R_1$ and $R_2$ are each a lower alkylene group and $R_3$ is a hydrogen atom or a lower alkyl group, Japanese Patent Publication No. 16035/1969 has disclosed polyurethane elastomers of the type which contain tertiary amino groups using, as chain propagators, diamines having a tertiary amino group in the molecular units thereof and A. Rembaum et al. have reported on polymers of the type which have a nitrogen atom quaternized by the reaction of an alkylene di-halide with an alkylene di-tert.-amine (J. Polymer Science, Part 13 7, 383 (1969)). Thus, various polymers possessed of an amino group have been made public but none of them are polyethers. The true status of affairs is that virtually nothing is known of polyethers of the type having an amino group. The only known polyethers having an amino group are the polymers disclosed in Japanese Patent Laid Open Publication No. 22197/1973 which are represented by the general formula:

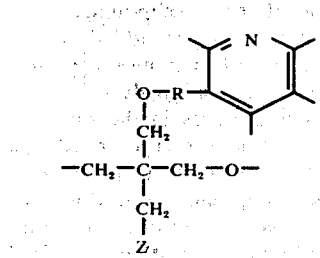

and which are obtained by causing poly-3,3-bis-(chloromethyl)oxethane to react with a pyridine type phenate of hydroxyamineN-oxide and subsequently reducing the resultant N-oxide.

BRIEF DESCRIPTION OF THE INVENTION

It is, therefore, the primary object of the present invention to provide polymers which have high amino group contents and which excel in thermal stability and exhibit high resistance to water and chemicals.

Another object of the present invention is to provide polyethers which can be used as modifiers for the improvement of dyeability of various fibers and are also usable as coagulants, anion-exchange resins and physiologically active substances.

These and other objects, features and advantages of the present invention will become apparent from following description.

The inventors pursued a study with a view to accomplished the aforementioned objects. They have, consequently, learned that specific glycols, when heated in the presence of a specific catalyst, undergo polycondensation to produce polyethers having an amino group and that the polyethers thus produced enjoy high thermal stability.

After a further study pursued with a view of attaining the same objects, they have acquired the knowledge that when the abovementioned glycols and specific compounds having a phenolic hydroxyl group are heated in the presence of the catalyst, they undergo copolycondensation to afford polyethers having an amino group and that the polyethers thus obtained enjoy high thermal stability.

The present invention has been accomplished on the basis of the aforementioned knowledge.

DETAILED DESCRIPTION OF THE INVENTION

The polyethers of the present invention are obtained by polycondensation of amino glycols of the general formula:

wherein, $R_1$ and $R_2$ are each a hydrogen atom or an alkyl group having 1 to 6 carbon atoms and, $R_1$ and $R_2$, when these are bonded to each other, may be polymethylene groups that form a heteroring with the nitrogen atom, $R_3$ is a hydrogen atom or an alkyl group of 1 to 4 carbon atoms. In the foregoing formula (5), when $R_1$ and $R_2$ are both alkyl groups, they are desired to be alkyl groups having 1 to 4 carbon atoms and when either member of $R_1$ and $R_2$ is a hydrogen atom, the other member may be an alkyl group of 5 or 6 carbon atoms or may be a branched alkyl group. Examples of the amino groups include 2-dimethyl aminomethyl-2-methyl-1,3-propane diol, 2-diethyl aminomethyl-2-methyl-1,3-propane diol, 2-di-n-propyl aminomethyl-3-methyl-1,3-propane diol, 2-di-n-butyl aminomethyl-2-methyl-1,2-propane diol, 2-di-n-amyl aminomethyl2-methyl-1,3-propane diol, 2-di-n-hexyl aminomethyl-2-methyl1,3-propane diol, 2-piperidylmethyl-2-methyl-1,3-propane diol, 2-ethyl aminomethyl-2-methyl-1,3-propane diol, 2-n-propyl aminomethyl-2-methyl-1,3-propane diol, 2-iso-propyl aminomethyl2-methyl-1,3-propane diol, 2-n-butyl aminomethyl-2-methyl-1,3-propane diol, 2-isobutyl aminomethyl-2-methyl-1,3-propane diol, 2-tert.-butyl aminomethyl-2-methyl-1,3-propane diol, 2-cyclohexyl aminomethyl-2-methyl-1,3-propane diol, 2-benzyl aminomethyl2-methyl-1,3-propane diol, 2-dimethyl aminomethyl-2-ethyl-1,3-propane diol, 2-diethyl aminomethyl-2-ethyl-1,3-propane diol, 2-di-n-propyl aminomethyl-2-ethyl-1,3-propane diol, 2-di-n-butyl aminomethyl 2-ethyl-1,3-propane diol, 2-di-n-amyl aminomethyl-2-ethyl-1,3-propane diol, 2-di-n-hexyl aminomethyl-2-ethyl-1,3-propane diol, 2-piperidylmethyl-2-ethyl-1,3-propane diol, 2-dimethyl aminomethyl-1,3-propane diol, 2-diethyl aminomethyl-1,3-propane diol, 2-di-n-propyl aminomethyl-1,3-propane diol, 2-di-n-butyl aminomethyl-1,3-propane diol, 2-di-n-amyl aminomethyl-1,3-propane diol, 2-di-n-hexyl aminomethyl-1,3-propane diol ad 2-piperidylmethyl-1,3-propane diol.

The polyethers of the present invention can also be obtained by copolycondensation of the amino glycols with specific compounds having a phenolic hydroxyl group. The specific compounds are those represented by the following formulas (6), (7), (8) and (9).

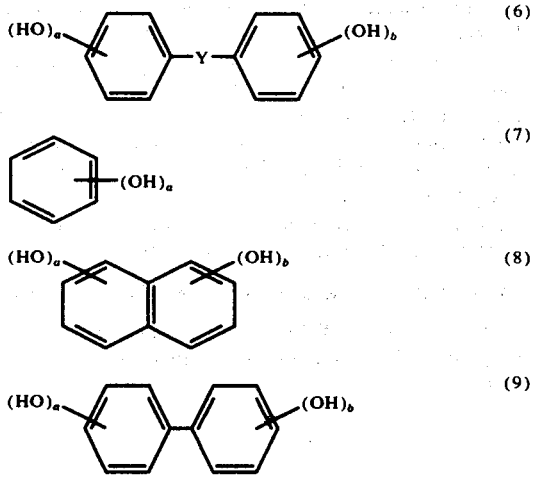

In these formulas (6) through (9), $a$ is 1 or 2 and $b$ is either 0 or 1, provided $a$ and $b$ are so selected from the respective ranges as to satisfy the relationship of $a + b = 2$. In formula (6), Y denotes an alkylene group having 1 to 4 carbon atoms, an alkylidene group of 3 to 15 carbon atoms, $-O-$, $-SO_2-$, $-S-$ or $>C=O$. Further, in the foregoing formulas (6) through (9), each aromatic ring may be substituted by an alkyl group having 1 to 4 carbon atoms, an acyl group, a lower alkoxy group or a halogen atom. As preferable examples of such compounds having a phenolic hydroxyl group, there can be cited the following:

i. Compounds of Formula (6): Bis(4-hydroxyphenyl)-methane, 2,2′-bis(4-hydroxyphenyl)-propane, bis(4-hydroxyphenyl)thioether; bis(4-hydroxyphenyl)-sulfone, 2,2′-dihydroxybenzophenone, and 2,2′-dihydroxy-4,4′-dimethoxybenzophenone.
ii. Compounds of Formula (7): Resoreinol, hydroquinone, 2-methylhydroquinone and 2,4-dihydroxyacetophenone.
iii. Compound of Formula (8): 1,5-Dihydroxy naphthalene
iv. Compounds of Formula (9): 2,2′-Dihydroxy-biphenyl and 4,4′-dihydroxybiphenyl The polycondensation of amino glycols or the copolycondensation of amino glycols and the aforementioned compounds having a phenolic hydroxyl group requires catalysis by use of phosphorous compounds. When the polycondensation or copolycondensation is catalyzed by use of an ordinary acid catalyst such as sulfuric acid or p-toluenesulfonic acid, for example, it tends to entail a decomposition reaction and consequently, fails to produce a polyether of a sufficiently high molecular weight. Use of a phosphorous compound readily induces a dehydrating polycondensation reaction without entailing such a decomposition reaction. In addition, where the catalysis is effected by use of the oxy acid compound of phosphorous, it becomes possible to obtain polyethers of varying molecular weights, low or high, by suitable selecting the reaction conditions involved. Phosphorous compounds which are suitable for the purpose of the catalysis are those represented by the following formulas (10) or (11).

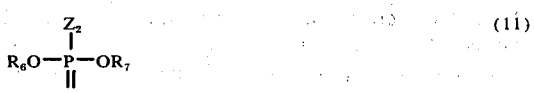

In formulas (10) and (11) shown above, $Z_1$ and $Z_2$ each denote a hydroxyl group, a lower alkyl group of 1 to 6 carbon atoms, an alkoxy group of 1 to 20 carbon atoms or an aryloxy group and $R_4$, $R_5$, $R_6$ and $R_7$ each denote a hydrogen atom, an alkyl group of 1 to 20 carbon atoms, a cycloalkyl group, an aryl group or an aralkyl group.

Preferably examples of phosphorous compounds include phosphorous acid, phosphoric acid, dimethyl phosphite, diethyl phosphite, dipropyl phosphite, triethyl phosphite, tripropyl phosphite, triphenyl phosphite, tribenzyl phosphite, tricyclohexyl phosphite, tritolyl phosphite, triamyl phosphite, tristearyl phosphite, methyl dihydrogen phosphate, butyl dihydrogen phosphate, diethyl hydrogen phosphate, dipropyl hydrogen phosphate, triethyl phosphate, tripropyl phosphate, triamyl phosphate, triphenyl phosphate, ethyl phosphorous acid, propyl phosphorous acid, phenyl phosphorous acid, diethylmethyl phosphonite, diphenylmethyl phosphonite, diethylphenyl phosphonite, diethylbenzyl phosphonite, methyl phosphonic acid, phenylphosphonic acid, cyclohexylphosphonic acid, ethyl hydrogen phenyl phosphonate, dipropylmethyl phosphonate, diethylmethyl phosphonate and diethylethyl phosphonate.

When the amino glycol is subjected to polycondensation by the use of such phosphorous compounds as the catalyst, phosphorous compounds are added to the amino glycol in a proportion of 0.1 to 20 mol %, preferably 0.5 to 10 mol %, based on the amino glycol and the reactants are heated at temperatures in the range of from 150° to 300° C under normal pressure or reduced pressure, with the by-produced water removed simultaneously with the progress of the reaction. In this case, the length of the reaction varies with the molecular weight which the finally obtained polyether is desired to have. Generally, polyethers having molecular weights of the order of 300 to 20,000 are obtained in 3 to 10 hours of reaction time. In the copolycondensation of the amino glycol and the compound possessed of a phenolic hydroxy group, a copolycondensed polyether can be obtained by having one or more compounds each containing a phenolic hydroxyl group added in a combined proportion of 0.05 with respect to 100 mol % to the amino glycol and subjecting the reactants to reaction in the presence of the phosphorous compounds as described above. When the copolycondensation is effected as just described, there can be obtained an alternative copolycondensation product by using said compound having phenylic hydroxyl groups and the amino glycol in substantially equivalent molar amounts. Compared with the polycondensation involving the amino glycol alone, the copolycondensation effected between the amino glycol and the compound having a phenolic hydroxyl group has an advantage in that the polymerization velocity is higher and therefore, the polymer of a higher molecular weight is readily produced.

The polyethers which are obtained as described above according to the present invention are the polymers of the general formula:

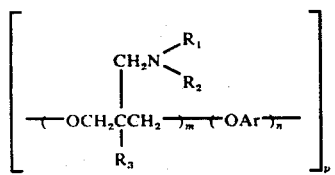

wherein, $R_1$ and $R_2$ are each a hydrogen atom or an alkyl group having 1 to 6 carbon atoms and, $R_1$ and $R_2$, when these are bonded to each other, may be polymethylene groups that form a heteroring with the nitrogen atom, $R_3$ is a hydrogen atom or an alkyl group of 1 to 4 carbon atoms, $m$ is an integer from 1 to 20, $n$ is 0 or 1, $p$ is an integer from 5 to 1000 and Ar is at least one member selected from the group consisting of divalent aromatic residues of the following formulas:

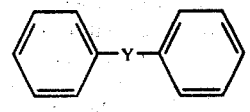
(1)

(2)

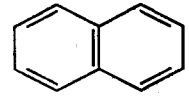
(3)

and

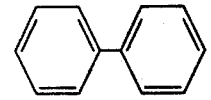
(4)

; in the formula (1), Y is an alkylene group of 1 to 4 carbon atoms, an alkylidene group of 3 to 15 carbon atoms, —O—, —$SO_2$—, —S— or >C=O. These polyethers have the following characteristics:

1. The polyethers of the present invention have higher amino group contents than the heretofore known polymers having an amino group.
2. They have excellent thermal stability. For example, they do not yield to degradation when they are left to stand at normal room temperature for a long period of time (1 to 3 years). They yield no decomposition and very little discoloration when they are heated at temperatures of 270° to 280° C for 10 hours. In contrast, the polymers having a pyridine group disclosed in the Japanese Patent Laid Open Publication No. 22197/1973 yield to discoloration and coloration when they are left to stand even at normal room temperature for just one month and the polyamides having an amino group disclosed in the Belgian Patent No. 693,000 as obtainable by the polymerization of diamines containing an amino group which is not destined to take part in the polymerization have their amino group retention ratios lowered to about 70 % when they are heated at 250° C for 2 hours. Incidentally in the process disclosed by Belgian Patent No. 693,000, since decomposition of the amino group also proceeds in the course of the polymerization reaction, it is difficult to obtain polyamides having high amino group contents.
3. They are excellent in hydrolysis-resisting property. They show no sign of loss of molecular weight when they are left to stand in an aqueous hydrochloric acid solution. Very little loss of molecular weight is observed when they are kept in boiling water. In contrast, the aforementioned known polyurethanes having an amino group readily undergo hydrolysis when they are left to stand in an aqueous hydrochloric acid solution or an aqueous caustic soda solution.

The polyethers according to the present invention have high, secondary or tertiary amino group contents, high thermal stability and excellent resistance to water and to chemicals as described above. They can, thereforem be utilized in a very wide variety of uses such as are shown below, for example:

a. In the spinning process of a varying synthetic fiber, the polyether of this invention may be blended with the polymer being used as the raw material for the synthetic fiber prior to spinning, for the purpose of imparting to the synthetic fiber desired affinity for acid dyes or improving such affinity originally possessed by the synthetic fiber.

b. When the polyether of this invention is made in the form of an insoluble polymer having a three-dimensional reticular structure, it can be used as an anion-exchange resin having excellent thermal stability. To be more specific, the polymer of three-dimensional reticular structure can be obtained by dissolving the polyether in a mixed dimethylformamidebenzene solvent, adding to the resultant solution 1 to 20 mol % of xylene dihalide based on the amino group of the polyether and allowing the reaction thereof to proceed at temperatures in the range of from 20° to 70° C. This polymer is excellent in thermal stability, hydrolysis-resisting property and oxidation-proof and is, therefore, can be used as an anion-exchange resin possessed of high ion-exchange capacity. In this case, the amino group in the exchange resin may be converted into a quaternary ammonium salt as with an alkyl halide or alkylidene halide. Because of the notably high thermal stability, the exchange resin produced consequently has an advantage that it can be effectively used at particularly high temperatures.

c. When the polyether is rendered soluble in water by having part of the whole of its amino group either hydrochlorinated or quaternized, the resultant product can be used advantageously as a cationic high molecular coagulant. As compared with the conventional cationic high molecular coagulants such as of polyacrylamide modified type, acrylic ester type and polyethylene imine type, this coagulant is excellent in storageability due to freedom from hydrolysis and oxidation. It, therefore, can be advantageously used for the removal of finely divided suspended particles as in waste water from gravel washing, waste water from coal dressing and waste water from dust collection; removal of coloring components and COD components from waste water from dyeing and waste pulp water; disintegration of emulsions as in oil-containing waste water and waste water from shampooing; and sedimentation, concentration, dehydration, etc. of excess activated sludge, digested sludge and waste sludge from paper manufacture. In addition, the coagulant excels over the conventional cationic high molecular coagulants in terms of velocity of sludge flotation, compressing property and dehydrating property and enjoys an advantage that it produces a smaller amount of ashes in the incineration of sludge.

d. The polyether makes an excellent raw material for physiologically active substances or for high molecular semiconductors. A complex of the sodium salt of heparin and a polymer obtained by treating the polyether so as to have part or the whole of the amino group thereof quaternized manifests a cancer-controlling effect and a complex of the polymer and 7,7,8,8-tetracyano quinodimethane exhibits outstanding electric conductivity.

The present invention will be described more specifically hereinbelow with reference to preferred embodiments. This invention is not limited in any way to these examples. The molecular weight of each of the polyethers reported in these examples was that which was obtained by dissolving a corresponding test specimen in chloroform and testing the resultant solution by use of a vapor pressure osmometer at a temperature of 37° C. The amino group content of each of the polyethers reported therein was determined by dissolving a corresponding test specimen in a mixed (9:1 voluminal) acetic acid-methanol solvent and titrating the resultant solution with a 1/10-N hydrochloric acid/isopropyl alcohol solution with the aid of a Potentiograph E-436 (manufactured by Metrohm Company, Switzerland). The amounts of amino groups reported in these examples are expressed in terms of weight percent of nitrogen. The numerical values indicated as nitrogen contents in parentheses are those calculated on the assumption that the corresponding molecular weights were infinitely great.

In the examples, the amounts reported in parts are those by weight.

EXAMPLE 1

In a polymerization tube provided with a branch, 800 parts of 2-dimethylamino-methyl-2-methyl-1,3-propane diol (hereinafter referred to briefly as GA) and 15 parts of phosphorous acid were placed and caused to react with each other under normal pressure, under a current of nitrogen at 200° to 250° C for 4 hours, with the water of dehydration being distilled out simultaneously. Then, the reaction system was reduced to 30 mmHg over a period of 2 hours. Subsequently, the reaction was allowed to proceed at 250° C under 0.3 mmHg for 2 hours. There was consequently obtained a colorless linear polyether of GA which has an average molecular weight (hereinafter referred to briefly as $\overline{Mn}$) of 7000 and a nitrogen content (hereinafter expressed as N content) of 10.78% and which was viscous at room temperature.

The properties of polyethers obtained from different glycols under the same reaction conditions are shown in a Table 1. In Table 1, the symbols $R_1$, $R_2$ and $R_3$ have the same meanings as those of $R_1$, $R_2$ and $R_3$, respectively, of the aforementioned formula (5).

Table 1

| No. | $R_1$ | $R_2$ | $R_3$ | $\overline{Mn}$ | BN(%) | |
|---|---|---|---|---|---|---|
| 1 | —CH$_3$ | —CH$_3$ | —CH$_3$ | 7000 | 10.78(10.85) | Property Colorless liquid viscous at room temperature |
| 2 | —C$_2$H$_5$ | —C$_2$H$_5$ | —CH$_3$ | 5020 | 8.83 (8.92) | " |
| 3 | n-C$_3$H$_7$ | n-C$_3$H$_7$ | —CH$_3$ | 4100 | 7.50 (7.59) | " |
| 4 | n-C$_4$H$_9$ | n-C$_4$H$_9$ | —CH$_3$ | 3500 | 6.51 (6.57) | " |
| 5 | t-C$_4$H$_9$ | H | —CH$_3$ | 2000 | 8.80 (8.92) | " |
| 6 | n-C$_4$H$_9$ | H | —CH$_3$ | 2300 | 8.84 (8.92) | " |
| 7 | ∧∧ | H | —CH$_3$ | 2100 | 7.55 (7.65) | " |

EXAMPLE 2

By following the procedure of Example 1, 800 parts of the same GA as used in Example 1 was subjected to reaction in the presence of a different catalyst. The polymers consequently obtained were basically the same as those obtained in Example 1. Table 2 shows the values of $\overline{Mn}$ and color tones of the polymers and the corresponding catalysts.

Table 2

| Catalysts | | $\overline{Mn}$ | Color tone |
|---|---|---|---|
| Diethyl hydrogen phosphite | 20.2 parts | 5300 | Color less |
| 85% Phosphoric acid(①) | 16.8 | 3600 | Orange |
| ①+ Diethylphosphite | 10 | 5400 | Color less |
| Tristearyl phosphite | 123 | 5000 | " |
| Triethyl phosphite | 16.6 | 5400 | " |
| Phenyl phosphoric acid | 15.8 | 3000 | Orange |

EXAMPLE 3

The polyether, No. 1, in Table 1 under Example 1 was rendered soluble in water by having 30 % of its basic nitrogen hydrochlorinated. The modified polyether was used as a high molecular coagulant in the treatment of a waste water of an acid dye. Table 3 compares the results of this treatment with those obtained by using a cationic polyacrylamide type high molecular coagulant.

Table 3

| Properties of waste water | Appearance<br>pH<br>Absorption coefficient<br>Transparency<br>COD | Dark navy blue<br>4.8<br>19.5 %<br><br>1.2 cm<br>2,400 PPM | |
|---|---|---|---|
| Amount of coagulant used | Polyether HCl 150 PPM<br>Coagulation aid<br>(Bentonite) 40 PPM | Cationic polyacrylamide 150 PPM<br>Coagulation aid 40 PPM | |
| Properties of treated water | Color removal<br>Transparency<br>COD<br>Floating scum | 99.5<br>35 cm above<br>100 PPM<br>3 % | 97 %<br>20 cm above<br>200 PPM<br>2.8 % |

Table 3-continued concentration

EXAMPLE 4

In a polymerization tube provided with a branch, 404 parts of GA, 570 parts of 2,2-bis(4-hydroxyphenyl)propane (hereinafter referred to briefly as BPA) and 8.2 parts of phosphorous acid were placed and were caused to react under normal pressure, under a current of nitrogen at 220° to 230° C for 2 hours, with the water of dehydration simultaneously removed. Then, the reaction system was elevated to 240° C and reduced to 0.3 mmHg over a period of 60 minutes. Subsequently, the polymerization reaction was allowed to proceed at 240° C under 0.3 mmHg for 2 hours. There was consequently obtained an alternatingly linked polyether of GA and BPA which had 7,9000 of $\overline{Mn}$, 4.18% of BN content (4.13%) and 83°–84° C of MP.

When this polymer was dissolved in dehydrated benzene, a benzene solution of cyanuric chloride was introduced dropwise (in an amount to permit incorporation of 1% by weight of cyanuric chloride based on the polymer) into the polymer solution, water in a volume three times as large and a surface active agent in a small volume were subsequently added thereto and the resultant mixture was heated to 90° C under simultaneous agitation to vaporize out the benzene, and there was obtained a solution containing polymer globules. The dispersion containing the polymer globules was diluted with a large volume of water and cooled and the polymer globules were separated from the dispersion and dried at 120° C under 0.1 mmHg. The polymer which had undergone cross-linking and consequently became insoluble in solvents was allowed to react with gaseous methyl bromide and then treated with an aqueous caustic soda solution. There was consequently obtained a strongly basic anion-exchange resin. It was measured to have a total ion-exchange capacity of 2.8 meq/dry resin and a highest operating temperature of 130° C and was shown to be usable in a wide range of pH values from 0 to 14.

EXAMPLE 5

By following the procedure of Example 4, varying alternatingly linked polyethers were obtained by causing different glycols to react with BPA. The properties of the polyethers are shown in Table 4, in which the symbols $R_1$, $R_2$ and $R_3$ have the same meanings as those of $R_1$, $R_2$ and $R_3$, respectively, of the aforementioned formula (5).

Table 4

| No. | $R_1$ | $R_2$ | $R_3$ | Glycols used (part) | $\overline{Mn}$ | BN (%) | M.P. (° C) | Color tone |
|---|---|---|---|---|---|---|---|---|
| 1 | $C_2H_5$ | $C_2H_5$ | $CH_3$ | 481 | 4800 | 3.88 (3.81) | 59 – 60 | Colorless |
| 2 | n-$C_3H_7$ | n-$C_3H_7$ | $CH_3$ | 558 | 3230 | 3.60 (3.54) | 30 | " |
| 3 | n-$C_4H_9$ | n-$C_4H_9$ | $CH_3$ | 636 | 2745 | 3.40 (3.31) | liquid | " |

EXAMPLE 6

In a polymerization flask provided with a branch, 404 parts of the same GA as used in Example 1, 8.3 parts of phosphorous acid and a compound having a different phenolic hydroxyl group were placed and allowed to react by following the procedure of Example 4. The properties of different alternating linked polyethers are shown in Table 5.

Table 5

| No. | Compound of aromatic OH group | Quantity used (part) | $\overline{Mn}$ | BN(%) | M.P | Color tone |
|---|---|---|---|---|---|---|
| 1 | HO—⟨◯⟩—$SO_2$—⟨◯⟩—OH | 625 | 4700 | 3.94 (3.88) | 120 – 121°C | Light yellow |
| 2 | HO—⟨◯⟩—OH (meta) | 275 | 4500 | 6.45 (6.33) | 68 – 69 | " |
| 3 | naphthalene-1,5-diol (OH, OH) | 400 | 4500 | 5.25 (5.17) | 73 – 74 | Yellow |
| 4 | ⟨◯⟩—C(=O)—⟨◯⟩(OH)—OH | 536 | 2900 | 4.39 (4.31) | 72 – 73 | Yellow brown |

Table 5-continued

| No. | Compound of aromatic OH group | Quantity used (part) | $\overline{Mn}$ | BN(%) | M.P | Color tone |
|---|---|---|---|---|---|---|
| 5 | 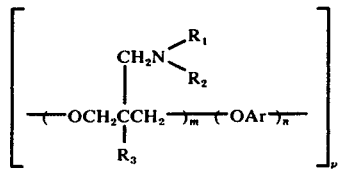 | 466 | 3100 | 4.75 (4.71) | 70 – 71 | Color less |

EXAMPLE 7

Under a current of nitrogen, 191 parts of the polyether, No.2, in Table 5 of Example 6 was thoroughly mixed with 3,810 parts of polyethylene terephthalate-isophthalate (the ratio of terephthalic acid to isophthalic acid 9:1) having an intrinsic viscosity of 0.65 at 260° C for 30 minutes and the resultant mixture was pelletized. The mixed polymer was measured to have 245° C of MP and 0.62 of intrinsic viscosity and was observed to be only slightly colored. The pellets were melt spun at 260° C and the extruded threads were elongated to 400% at 70° C and subjected to heat setting at 180° C for 5 seconds to afford textile filaments. When the filaments were dyed under the following conditions, they were invariable dyed fast from medium to dark tints. Dyeing conditions:
Acid dye* 3% owf
Formic acid 5% owf
Bath ratio 1:50
Temperature and time 120° C, 1 hour

* Six acid dyes of Suminol, Milling Yellow-MR and other Suminol colors (manufactured by Suminol colors (manufactured by Sumitomo Chemical Co., Ltd.)

EXAMPLE 8

By following the procedure of Example 4, 404 parts of GA, 285 parts of BPA, 137 parts of resorcinol and 8.2 parts of phosphorous acid were combined and allowed to react to afford a light yellow polyether having 8.070 of $\overline{Mn}$, 5.4% (5.23 %) of BN and 59 to 60° C of MP. In this case, the results of the IR spectrometry, NMR spectrometry and elementary analysis indicate that ether links having aromatic groups mutually polycondensed therein were not present in the polyether.

We claim:

1. Polyethers of the general formula:

$$\left[ \begin{array}{c} \text{CH}_2\text{N} \diagup_{R_2}^{R_1} \\ | \\ -(-\text{OCH}_2\underset{|}{\text{C}}\text{CH}_2-)_m-(-\text{OAr}-)_n- \\ R_3 \end{array} \right]_p$$

wherein, $R_1$ and $R_2$ are each a hydrogen atom or an alkyl group having 1 to 6 carbon atoms and, $R_1$ and $R_2$, when these are bonded to each other, are polymethylene groups that form a heteroring with the nitrogen atom, $R_3$ is a hydrogen atom or an alkyl group of 1 to 4 carbon atoms, $m$ is an integer from 1 to 20, $n$ is 0 or 1, $p$ is an integer from 5 to 1000 and Ar is at least one member selected from the group consisting of divalent aromatic residues of the following formulas:

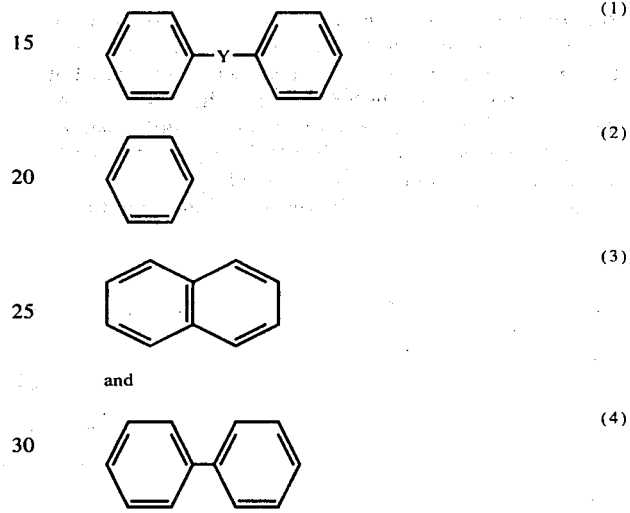

in which in the formula (1), Y is an alkylene group of 1 to 4 carbon atoms, an alkylidene group of 3 to 15 carbon atoms, —O—, —SO$_2$—, —S— or >C=O.

2. Polyethers according to claim 1, wherein $R_1$ and $R_2$ are the same or different straight-chain alkyl groups having 1 to 4 carbon atoms and $R_3$ is a hydrogen atom, a methyl group or an ethyl group.

3. polyethers according to claim 1, wherein either member of $R_1$ and $R_2$ is a hydrogen atom and the other member thereof is an alkyl group having 1 to 6 carbon atoms and $R_3$ is a hydrogen atom, a methyl group or an ethyl group.

4. Polyethers according to claim 1, wherein $R_1$ and $R_2$ are each a straight-chain alkyl group having 1 to 4 carbon atoms, $R_3$ is a hydrogen atom, a methyl group or an ethyl group and Ar is a group of formula (1) in which Y is

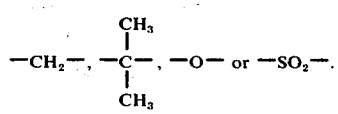

5. Polyethers according to claim 1, wherein either member of $R_1$ and $R_2$ is a hydrogen atom and the other member thereof is an alkyl group having 1 to 6 carbon atoms, $R_3$ is a hydrogen atom, a methyl group or an ethyl group and Ar is a group of formula (1) in which Y is

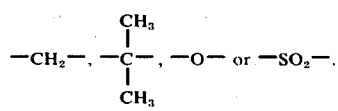

6. The process for the manufacture of polyethers according to claim 9, wherein said phosphorous compound is used in an amount in the range of from 0.1 to 20 mol % based on the amino glycol of claim 7.

7. Polyethers according to claim 1, which are prepared by subjecting amino glycols of the following general formula:

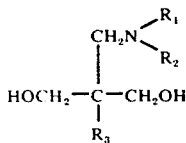 (5)

wherein $R_1$ and $R_2$ are each a hydrogen atom or an alkyl group having 1 to 6 carbon atoms and, $R_1$ and $R_2$, when these are bonded to each other, are polymethylene groups that form a heteroring with the nitrogen atom, and $R_3$ is a hydrogen atom or an alkyl group of 1 to 4 carbon atoms, to polycondensation at a temperature of from 150° to 300° C., the by-product water formed thereby being removed simultaneously during the course of the reaction.

8. Polyethers according to claim 1, which are prepared by the copolycondensation of the amino glycols of claim 7 with at least one member of compounds having a phenolic hydroxyl group selected from the group consisting of:

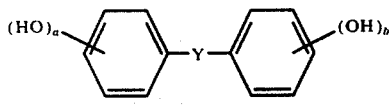 (6)

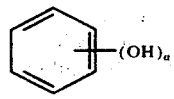 (7)

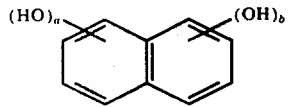 (8)

and

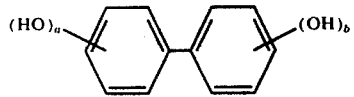 (9)

wherein in formula (6), Y is an alkylene group having 1 to 4 carbon atoms, an alkylidene group having 3 to 15 carbon atoms, —O—, —$SO_2$—, —S— or >C=O and in formulas (6) through (9), $a$ is 1 or 2 and $b$ is 0 or 1 and $a$ and $b$ are so selected as to satisfy the relationship of $a + b = 2$, said copolycondensation being conducted at a temperature of from 150° to 300° C., the by-product water formed thereby being removed simultaneously during the course of the reaction.

9. A process for the manufacture of polyethers according to claim 1, which comprises subjecting the amino glycols of claim 7 to dehydrating polycondensation in the presence of at least one phosphorus compound selected from the group consisting of:

 (10)

and

 (11)

wherein $Z_1$ and $Z_2$ are each a hydroxy group, a lower alkyl group having 1 to 6 carbon atoms, a cycloalkyl group having 6 and 12 carbon atoms, an alkoxy group having 1 to 20 carbon atoms or an aryloxy group, $R_4$, $R_5$, $R_6$ and $R_7$ are each a hydrogen atom, an alkyl group having 1 to 20 carbon atoms, a cycloalkyl group, an aryl group or an aralkyl group, said polycondensation being conducted at a temperature of from 150° to 300° C., the by-product water formed thereby being removed simultaneously during the course of the reaction.

10. The process for the manufacture of polyethers according to claim 1, which comprises subjecting the amino glycols of claim 7 to dehydrating polycondensation with at least one compound having a phenolic hydroxyl group as defined in claim 14 in the presence of at least one phosphorus compound as defined in claim 15, said polycondensation being conducted at a temperature of from 150° to 300° C., the by-product water formed thereby being removed simultaneously during the course of the reaction.

11. Polyethers according to claim 1, wherein the amino groups thereof are present in the salt form with a hydrogen halide or are quaternized with a quaternizing agent of the general formula RX wherein R is an alkyl group having 1 to 4 carbon atoms or an aralkyl of 7 to 13 carbon atoms and X is an OH group, a halogen or an organic acid or inorganic acid radical.

* * * * *